US008812362B2

(12) United States Patent
Agarwal et al.

(10) Patent No.: US 8,812,362 B2
(45) Date of Patent: Aug. 19, 2014

(54) METHOD AND SYSTEM FOR QUANTIFYING USER INTERACTIONS WITH WEB ADVERTISEMENTS

(75) Inventors: Deepak K. Agarwal, Sunnyvale, CA (US); Vanja Josifovski, Los Gatos, CA (US); Andrei Broder, Menlo Park, CA (US); Evgeniy Gabrilovich, Sunnyvale, CA (US); Robert Hall, Pittsburgh, PA (US)

(73) Assignee: Yahoo! Inc., Sunnyvale, CA (US)

( * ) Notice: Subject to any disclaimer, the term of this patent is extended or adjusted under 35 U.S.C. 154(b) by 937 days.

(21) Appl. No.: 12/390,048

(22) Filed: Feb. 20, 2009

(65) Prior Publication Data
US 2010/0217648 A1    Aug. 26, 2010

(51) Int. Cl.
G06Q 30/02    (2012.01)
G06F 17/30    (2006.01)

(52) U.S. Cl.
USPC ............... 705/14.53; 707/999.03; 705/14.73; 705/37

(58) Field of Classification Search
CPC ..... G06Q 30/02; G06Q 30/0254; G06F 17/30
USPC .............. 1/1; 705/9, 10, 14.49, 1, 14, 27, 37, 705/14.53, 14.73; 707/3, 5, 769, 999.003; 709/219, 224; 715/207; 726/5, 1; 455/414
See application file for complete search history.

(56) References Cited

U.S. PATENT DOCUMENTS

| | | | | |
|---|---|---|---|---|
| 5,948,061 | A * | 9/1999 | Merriman et al. | 709/219 |
| 6,978,263 | B2 * | 12/2005 | Soulanille | 1/1 |
| 7,100,111 | B2 * | 8/2006 | McElfresh et al. | 715/207 |
| 7,110,993 | B2 * | 9/2006 | Soulanille et al. | 707/735 |
| 7,136,860 | B2 * | 11/2006 | Doliov | 1/1 |
| 7,181,438 | B1 * | 2/2007 | Szabo | 1/1 |
| 7,373,599 | B2 * | 5/2008 | McElfresh et al. | 715/210 |
| 7,818,208 | B1 * | 10/2010 | Veach | 705/14.49 |
| 2003/0032409 | A1 * | 2/2003 | Hutcheson et al. | 455/414 |
| 2003/0233250 | A1 * | 12/2003 | Joffe et al. | 705/2 |
| 2004/0039663 | A1 * | 2/2004 | Kernz | 705/27 |
| 2006/0074868 | A1 * | 4/2006 | Khaliq et al. | 707/3 |

(Continued)

FOREIGN PATENT DOCUMENTS

EP    1 734463    * 12/2006    ............... G06K 9/68

OTHER PUBLICATIONS

Hammami et al., Automatic violent content web filtering approach based on the KDD process, Emerald Insight, International Journal of Web Information, Research paper, 2005, pp. 1-2.*

(Continued)

*Primary Examiner* — Barbara Amelunxen
(74) *Attorney, Agent, or Firm* — Berkeley Law & Technology Group, LLP

(57) ABSTRACT

Methods and systems are provided that may be used to determine a probability of whether a visitor to a web document is likely to click on a web advertisement. An exemplary method may include detecting one or more features in a web document. One or more expert statistical models to which the web document belongs may be determined and associated weightings may be determined based, at least in part, on the one or more features detected. A click-through-rate probability for a web advertisement to be placed on the web document may be estimated based on the one or more expert statistical models.

18 Claims, 4 Drawing Sheets

(56) References Cited

U.S. PATENT DOCUMENTS

| | | | |
|---|---|---|---|
| 2006/0149565 A1* | 7/2006 | Riley | 705/1 |
| 2006/0229896 A1* | 10/2006 | Rosen et al. | 705/1 |
| 2006/0288100 A1* | 12/2006 | Carson et al. | 709/224 |
| 2007/0156514 A1* | 7/2007 | Wright et al. | 705/14 |
| 2008/0052219 A1* | 2/2008 | Sandholm et al. | 705/37 |
| 2008/0097834 A1* | 4/2008 | McElfresh et al. | 705/10 |
| 2009/0222313 A1* | 9/2009 | Kannan et al. | 705/9 |
| 2009/0241174 A1* | 9/2009 | Rajan et al. | 726/5 |
| 2009/0254971 A1* | 10/2009 | Herz et al. | 726/1 |
| 2009/0265338 A1* | 10/2009 | Kraft et al. | 707/5 |
| 2009/0319517 A1* | 12/2009 | Guha et al. | 707/5 |
| 2011/0004618 A1* | 1/2011 | Chaudhary | 707/769 |

OTHER PUBLICATIONS

Deepayan Chakrabarti, et al., Contextual Advertising by Combining Relevance with Click Feedback, www 2008, Apr. 21-25, 2008, Bejing China, 10 pages.

* cited by examiner

METHOD AND SYSTEM FOR QUANTIFYING USER INTERACTIONS WITH WEB ADVERTISEMENTS

BACKGROUND

1. Field

The subject matter disclosed herein relates to quantifying user interactions with web advertisements.

2. Information

Web pages and blogs and becoming an increasingly popular source of information for more and more people every day. Publishers invest significantly on new web pages and increasingly desire financial rewards for these investments. To this end, many publishers provide text advertisements and/or graphical advertisements on their web pages and/or blogs. There are several ways in which a publisher can earn revenue from web advertisements placed on their web pages and/or blogs.

One type of web advertisement results in a publisher being paid by a company associated with a web advertisement whenever someone selects a displayed advertisement by, for example, clicking on the web advertisement by placing a cursor over the web advertisement and clicking a button on a mouse. A company providing the web advertisements themselves, such as Yahoo!™ in the Yahoo! Publisher Network™, may also receive a portion of revenue whenever someone clicks on such web advertisements. Such web advertisements may therefore be a major source of revenue for both publishers and companies providing web advertisements. Accordingly, companies providing web advertisements sometime attempt to match web advertisements to content of a web page for which the web advertisement is to be displayed to ensure that web advertisements relevant to content of a web page are displayed.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
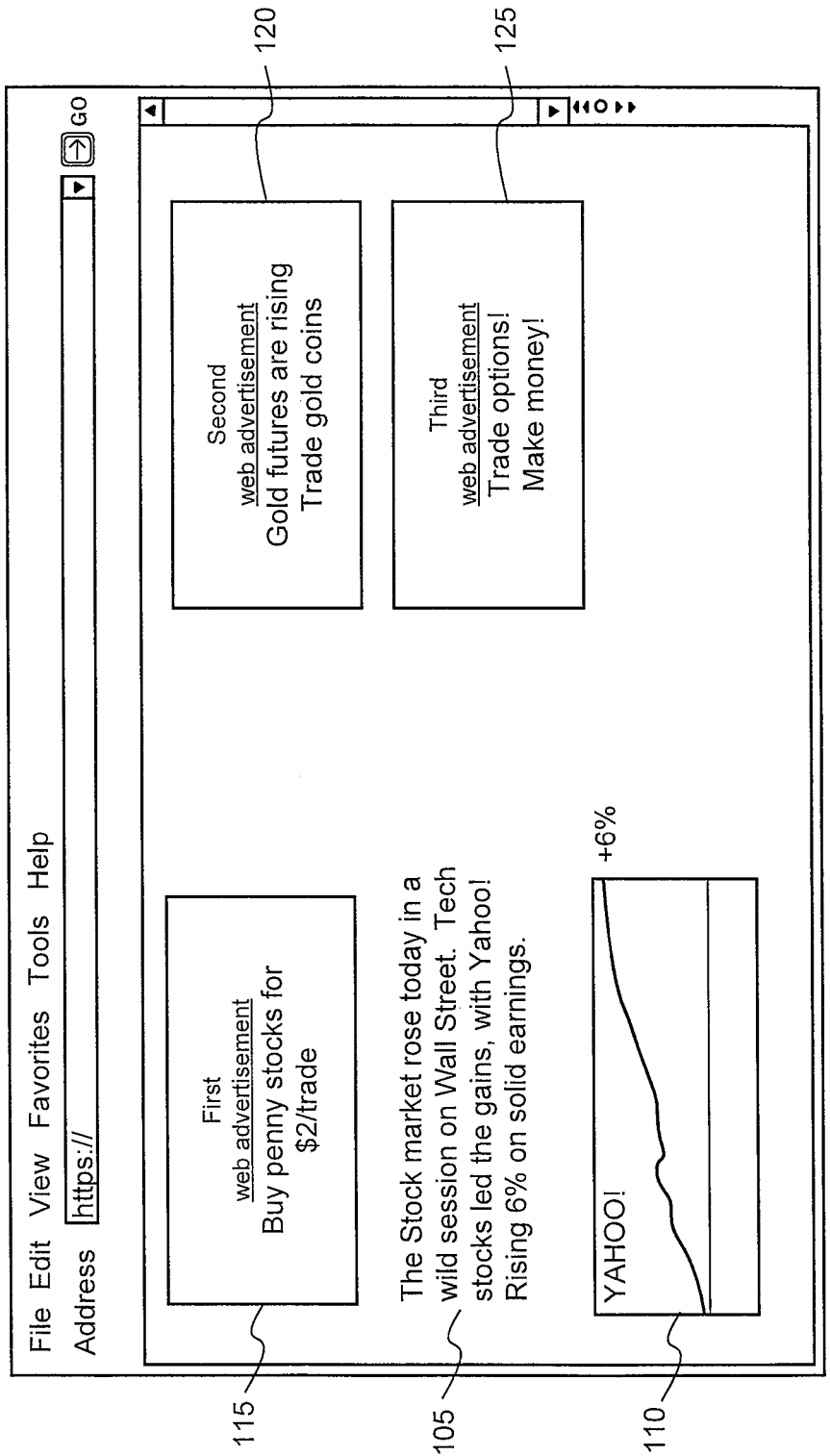
FIG. 1 illustrates a graphical representation of a web page that may be displayed in a web browser according to one particular implementation.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Some exemplary methods and systems are described herein that may be used to determine which web advertisement will generate the highest estimated revenue if placed on a particular web document such as a web page or search query. "Search query," as used herein may refer to a query entered to an Internet search engine. Upon entry of a search query to an Internet search engine, a list of top results, such as relevant web sites and/or media, for the search query may be determined and displayed.

In one particular implementation, web advertisements may comprise text web advertisements. According to one aspect, a probability that a user is going to click on a text web advertisement on a web page is estimated. Such a probability may be estimated based on factors such as a determination of certain features in a web page and in a text web advertisement, for example. After such factors for a web page/web advertisement pair have been determined, the web page/web advertisement pair may be associated with an expert statistical model. There may be many different expert statistical models available, and a web page/web advertisement pair is matched to an expert statistical model having a highest probability of predicting a user's likelihood of clicking on the web advertisement if it is placed on the web page to which it is paired. After an expert statistical model has been selected, a probability that a user is going to select or click on such a web advertisement is determined. A user may utilize a user interface to select such a web advertisement. For example, a user may utilize a computer mouse to position a graphical cursor in an area of a web page associated with a web advertisement and may subsequently click on the web advertisement by pressing a button on the mouse. Alternatively, a user may utilize a microphone and voice recognition system, a trackball, a keyboard, or any other user interface capable of receiving a user input corresponding to a selection of a web advertisement. Determining a probability that a user is going to select a web advertisement may be useful in determining how to allocate web advertisements to web pages in an effort to increase expected revenue paid to a provider of web advertisements if a user clicks on such web advertisements.

Some web advertisements are currently matched based solely on a relevance statistic determined for a web page. Such relevance statistic may be determined based on several factors, such as the keywords in the web page, keywords in a text web advertisement, a subject matter category of the web page and the text web advertisement, and keyword phrases utilized in both the web page and in the text web advertisement.

"Keyword," as used herein may refer to a word located in a web page, web advertisement, or search query that may have statistical relevance in categorizing subject matter of the web page, web advertisement, or search query. A keyword may comprise an uncommon word that may relate to the subject matter of content of a web page, web advertisement, or search query.

"Keyword phrase," as used herein may refer to a phrase located in a web page, web advertisement, or search query that may have statistical relevance in categorizing subject matter of the web page, web advertisement, or search query. A keyword phrase may include a plurality of keywords that may relate to the subject matter of content of a web page, web advertisement, or search query.

Text web advertisements may be matched to web pages based on a relevance statistic, as discussed above. However, relevance, by itself, may not be the best metric for matching text web advertisements with web pages because relevance does not account for a likelihood that a user is going to click on a web advertisement. Some current systems utilize a single logistic regression analysis between certain characteristics of a web page (such as, e.g., keywords used in the web page) and an entire corpus of web pages within an publisher network to determine which web advertisements are most relevant to a particular web page.

Many web advertisements require a user to click on a web advertisement in order for both the publisher and the provider of the web advertisement to be paid. Accordingly, accounting for the likelihood that a user is going to click on a web advertisement may be critical to determining the best web advertisement for a particular web page that will generate the most revenue for the publisher and the provider of the web advertisement. The most valuable web advertisement may not necessarily be the most relevant web advertisement as determined by a relevance statistic.

Current systems may utilize only relevance, but not a probability of a user clicking on a web advertisement, if determining which web advertisements to display on a given web page or search query result. However, relevance alone may be insufficient to effectively rank web advertisements because relevance does not account for a probability that a web advertisement will be selected by, e.g., being clicked upon. Advertisers may bid for the right to have their web advertisements displayed on web pages or search query results. Different advertisers may make different bids based on expected revenue. A determination of which web advertisements to display may be based on expected revenue. Expected revenue may be determined by, for example, multiplying (a) an estimated probability that a web advertisement will be clicked upon by (b) a bid that an advertiser has offered to pay for each time that a web advertisement for the bidding advertiser has been clicked upon.

To increase or enhance revenue, a company providing web advertisement to web pages and search query results may allow an advertiser to win an auction despite submission of a lower bid. For example, if one advertiser has bid $5 for every click on a web advertisement, and there is a 10% chance of a user clicking on that advertisement, expected revenue for that web advertisement on that webpage is $0.50. A second advertiser may bid $2 for every click on a web advertisement in which there is a 50% chance of a user clicking on that advertisement, such that expected revenue for that web advertisement is $1.00. In this example, the winner of the auction may be the second advertiser because the expected revenue from the second advertiser is higher than the expected revenue from the first avenue, despite the higher advertising bid of the first advertiser.

FIG. 1 illustrates a graphical representation of a web page 100 that may be displayed in a web browser according to one particular implementation. As shown, such a web page 100 include various information, such as text 105, a graphical image 110, which in this case depict a stock chart, a first web advertisement 115, a second web advertisement 120, and a third web advertisement 125. This exemplary web page 100 is for a stock market website that provides information relating to stock market news and personal finance. Such text 105 recites, "The stock market rose today in a wild session on Wall Street. Tech stocks led the gainers, with Yahoo! rising 6% on solid earnings." Such first, second, and third web advertisements 115, 120, and 125, respectively, may be provided based on the content included in web page 100.

For example, a publisher may publish content on web page 100, such as text 105 and graphical image 110. A publisher may have an arrangement with a provider of web advertisements, such as Yahoo!™ in the Yahoo! Publisher Network™, to provide web advertisements for web page 100, and both the publisher and the provider of web advertisements may receive revenue from a company advertising within one of the web advertisements whenever a user/visitor to web page 100 clicks on any of the web advertisements. To enhance or increase the likelihood of a user clicking on one of the web advertisements, the web advertisements may be matched to content of the web page based on a combination of relevance and likelihood that the user is going to click on one of the advertisements. An amount of times that a user clicks on a web advertisement relative to a number of users visiting a particular web page or search query on which such web advertisements are displayed is known as a "click-through-rate."

Figure 2:
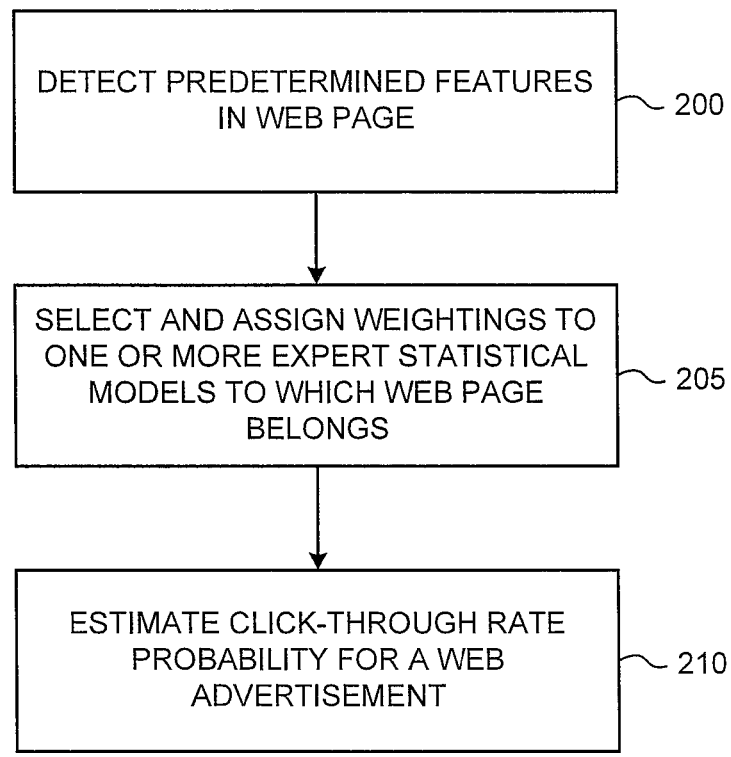
FIG. 2 illustrates a process for estimating a click-through-rate probability of a web advertisement on a web page according to one aspect.

FIG. 2 illustrates a process for estimating a click-through-rate probability of a web advertisement on a web page, such as web page 100, according to one aspect. First, predetermined features in web page 100 are detected or determined. Such predetermined features may include a presence and frequency of keywords used in text on the web page 100. Referring back to FIG. 1, text 105 may include a number of keywords which may be utilized to categorize web page 100. Key words may include words such as "stock," "market," "rose," "wild," "session," "Wall," "Street," "Tech," "stocks," "led," "gainers," "Yahoo!," "rising," "6%," solid," and "earnings," for example. There are other common words which may not be keywords, as they may not be descriptive of content of text 105, such as words "the," "in," and "a."

Web page 100 may be ranked by extracting such keywords and attaching a Term Frequency Inverse Document Frequency (TFIDF) vector or score to each keyword. A TFIDF vector may indicate how frequently a keyword appears on a webpage 100. A TFIDF vector may also effectively measure how rare a keyword is in the entire corpus of web pages for which a provider of web advertisements supplies such web advertisements. If a keyword is relatively rare within such a corpus of web pages and it appears on a webpage, it may be assumed to be a discriminatory keyword that may be valuable for categorizing such a web page. In this example, keywords such as "stock," "market," "tech," and "Yahoo!" may be relatively rare keywords which indicate that text 105 of web page 100 is directed to stock market-related information.

Additional predetermined features that are considered in operation 200 may further relate to such keywords. For example, keywords contained within a title on a webpage may be more heavily weighted than keywords located elsewhere on the webpage. Moreover, keywords located near the beginning of the words of text 105 may also be weighted more heavily in some implementations.

Another predetermined feature that may be considered is the presence of keyword phrases, e.g., phrases comprised of keywords which may be useful in categorizing content of a web page 100. In this example, keyword phrases may include "stock market," "Wall Street," and "solid earnings," to name a few examples. Such keyword phrases may indicate relevant subject matter of a web page 100.

Other predetermined features that may be considered include a Publisher Identifier ("ID") indicative of a publisher of a group of web pages. Different publishers may typically place web advertisements in different locations on a web page. For example, one automobile company may include web advertisements located at the upper right-hand side of a web page, whereas a different automobile company may include web advertisements location at the upper-left hand side of a web page. Similarly, a finance-related website might include text web advertisements located at the center of the top of a web page. A location in which a text web advertisement is placed may have a bearing upon a probability that a user will click on the text web advertisement.

In one implementation, a predetermined feature may comprise a relevance score. As discussed above, text 105 within a web page 100 may be analyzed to identify certain keywords and keyword phrases within the web page 100. Similarly, a web advertisement may be analyzed to identify certain keywords and keyword phrases in the web advertisement. A TFIDF vector for keywords in a web page 100 and a TFIDF vector for keywords utilized in a web advertisement may each be determined. To determine how closely a web advertisement matches with a given web page, a cosine similarity function is determined based on a comparison of TFIDF vectors for keywords utilized in the web page versus TFIDF vectors of keywords utilized in a web advertisement. A cosine similarity function may estimate a likelihood that subject matter of a web page is related to subject matter of a web advertisement. If particular keywords appear frequently in both a web page and in a web advertisement, a cosine similarity of such keywords between the web page and the web advertisement may be determined to be relatively high. In one implementation, a cosine similarity may be scaled between 0.0 and 1.0, with a score of 1.0 indicating a high relevance between keywords in a web page and keywords in a web advertisement.

If a determined cosine similarity value is high (e.g., closer to 1.0), then a web advertisement may be determined to be relevant, for example. If such a cosine similarity is low (e.g., closer to 0.0), on the other hand, a web advertisement is determined to be less relevant and a bad match for a particular web page. Similarity of keywords between a web page and a web advertisement may be expressed as a semantic value.

Other semantic values may also be determined. A semantic value for keyword phrases utilized in both a web page and in a web advertisement may also be determined and a TFIDF vector may be determined for such keyword phrases. Keyword phrases in a web advertisement may also be determined and a TFIDF vector may be determined for the web advertisement. A cosine similarity value may subsequently be determined based on a comparison of a TFIDF vector for a web page and a TFIDF vector for a web advertisement. Similarity of keyword phrases between a web page and a web advertisement may be expressed as a semantic value.

A semantic value based on a determination of a taxonomy to which a web page and a web advertisement belong may also be determined. "Taxonomy," as used herein may refer to a categorization of a web page, web advertisement, or search query. In one implementation, a web page may, for example, be categorized by subject matter based on keywords used in the web page. Different categories of subject matter may include, for example, sports, personal finance, and automotive, to name just a few examples.

In accounting for taxonomy, a corpus of web pages and of web advertisements may be partitioned into various categories such as, for example, sports, automobiles, and personal finance, to name just a few examples. A category to which a web page belongs may be determined based upon keywords used in the web page. A TFIDS score may also be determined based upon the relevance of such a web page versus a category, to shoe how relevant the web page is to a particular category. Similarly, a web advertisement may also be categorized based upon keywords appearing in its text and a TFIDS score may be determined based upon how the web advertisement fits into a particular category. If both a web page and a web advertisement relate to the Los Angeles Dodgers baseball team, for example, a semantic value for the relevance of taxonomy between the web page and the web advertisement may be determined.

After such various semantic values based on different relevance or similarity criteria have been determined, such semantic values may be combined to determine an overall relevance of a particular web advertisement to a web page. There may be several semantic axes along which cosine similarities may be measured. A weighted average of the semantic axes may be determined and that results in a final score used to rank advertisements.

Referring again to FIG. 2, after predetermined features in a web page have been detected, one or more expert statistical models to which the web page belongs are selected and weightings are assigned at operation 205. "Expert statistical model," as used herein may refer to a statistical model for assessing features of a web page, web advertisement, or search query to predict the clickability of a web advertisement placed on the web page or search query results. Such features contained within a web page may include taxonomy of keywords in the web page, a Publisher Identifier ("ID") of a publisher for which information about other web pages by the same publisher is known, a position in which web advertisements are located on the web page, and relevance scores for the web page and associated web advertisements, to name just a examples.

A determination as to which expert statistical models a web page belongs is based on a comparison of predetermined features determined at operation 200 to predetermined features associated with one or more expert statistical models. There may be a plurality of expert statistical models, each of which is adapted to determine a click-through-rate for a web page based on weightings assigned to various features of the web page. By matching a web page with most closely related expert statistical models, a probability of a user clicking on a web advertisement may be determined with higher accuracy than would be possible if only a single statistical model were used to represent user behavior on the entire corpus of available web pages.

Separate relevance scores, each between a web page and various expert statistical models, may be determined. A weighting of a particular expert statistical model to a web page may be determined based on a relevance score. For example, an expert statistical model with a relatively high relevance score for a web page may have a relatively high weighting, whereas an expert statistical model with a relatively low relevance score for a web page may have a relatively low weighting.

At operation 210, a click-through-rate probability is estimated for a web advertisement matched with a web page. Such a click-through-rate probability may be utilized to determine which web advertisements should be placed on a particular web page in order to maximize expected advertising revenue.

Figure 3:
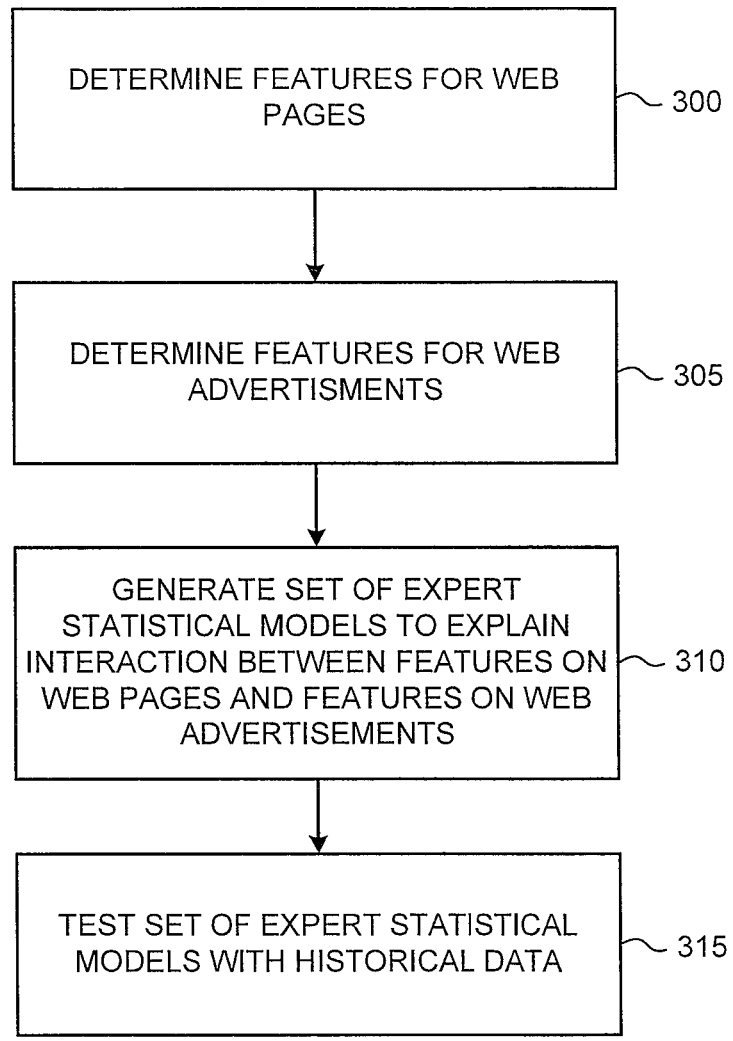
FIG. 3 illustrates a process for determining a set of expert statistical models for web pages according to one aspect.

FIG. 3 illustrates a process for determining a set of expert statistical models for web pages according to one aspect. First, at operation 300, features for web pages are determined. At operation 305, features for web advertisements may be determined. Such features may include some, or all, of those discussed above with respect to operation 200 of FIG. 2. A log of historical user interaction on web pages and with web advertisements may be stored for a certain length of time and may be utilized in operations 300 and 305 for training purposes.

At operation 310, a set of expert statistic models is generated to explain interaction between features on web pages and features on web advertisements. Such expert statistical models may be utilized to predict a probability of whether a user is going to click on a web advertisement on a web page. In generating a set of expert statistical models, a logistic regression may be performed based on features of web pages determined at operation 300 and features of web advertisements determined at operation 305. Such a logistic regression model may extrapolate from actual test data/features to determine a generalize rule to predict a probability of a user clicking on a web advertisement based on various features of web pages and web advertisements. In other implementations, other data analysis methods may be performed on the features other than a logistic regression such as, for example, any distribution belonging to a generalized linear model family.

Finally, at operation 315, a set of expert statistical models may be tested with historical data corresponding to web pages and web advertisements that was not previously utilized in operations 300 and 305. The process depicted in FIG. 3 may be a recursive process such that a set of expert statistical models is continually being modified/tweaked to ensure that the various expert statistical models closely predict a probability of a user clicking on a web advertisement on a web page.

Figure 4:
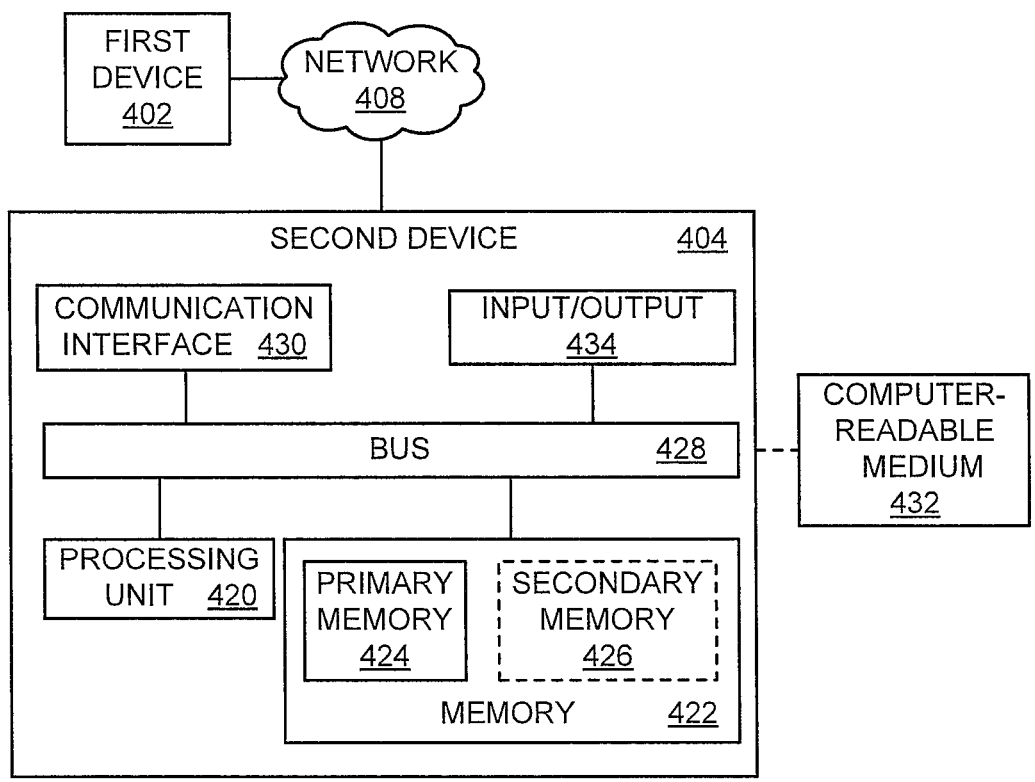
FIG. 4 is a schematic diagram illustrating a computing environment system that may include one or more devices configurable to estimating a click-through-rate probability of a web advertisement on a web page according to one implementation.

FIG. 4 is a schematic diagram illustrating a computing environment system 400 that may include one or more devices configurable to estimate a probability of a user clicking on a web advertisement, for example, according to one implementation. System 400 may include, for example, a first device 402 and a second device 404, which may be operatively coupled together through a network 408.

First device 402 and second device 404, as shown in FIG. 4, may be representative of any device, appliance or machine that may be configurable to exchange data over network 408.

First device 402 may be adapted to receive a user input from a user browsing the Internet, for example. By way of example but not limitation, either of first device 402 or second device 404 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 408, as shown in FIG. 4, is representative of one or more communication links, processes, and/or resources configurable to support the exchange of data between first device 402 and second device 404. By way of example but not limitation, network 408 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of first device 402, there may be additional like devices operatively coupled to network 408.

It is recognized that all or part of the various devices and networks shown in system 400, and the processes and methods as further described herein, may be implemented using or otherwise include hardware, firmware, software, or any combination thereof.

Thus, by way of example but not limitation, second device 404 may include at least one processing unit 420 that is operatively coupled to a memory 422 through a bus 428.

Processing unit 420 is representative of one or more circuits configurable to perform at least a portion of a data computing procedure or process. By way of example but not limitation, processing unit 420 may include one or more processors, controllers, microprocessors, microcontrollers, application specific integrated circuits, digital signal processors, programmable logic devices, field programmable gate arrays, and the like, or any combination thereof.

Memory 422 is representative of any data storage mechanism. Memory 422 may include, for example, a primary memory 424 and/or a secondary memory 426. Primary memory 424 may include, for example, a random access memory, read only memory, etc. While illustrated in this example as being separate from processing unit 420, it should be understood that all or part of primary memory 424 may be provided within or otherwise co-located/coupled with processing unit 420.

Secondary memory 426 may include, for example, the same or similar type of memory as primary memory and/or one or more data storage devices or systems, such as, for example, a disk drive, an optical disc drive, a tape drive, a solid state memory drive, etc. In certain implementations, secondary memory 426 may be operatively receptive of, or otherwise configurable to couple to, a computer-readable medium 432. Computer-readable medium 432 may include, for example, any medium that can carry and/or make accessible data, code and/or instructions for one or more of the devices in system 400.

Second device 404 may include, for example, a communication interface 430 that provides for or otherwise supports the operative coupling of second device 404 to at least network 408. By way of example but not limitation, communication interface 430 may include a network interface device or card, a modem, a router, a switch, a transceiver, and the like.

Second device 404 may include, for example, an input/output 434. Input/output 434 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 434 may include an operatively configured display, speaker, keyboard, mouse, trackball, touch screen, data port, to name just a few examples.

Some exemplary methods and systems are described herein that may be used to determine which web advertisements have the highest probability of being clicked when placed on a particular web document such as a web page or search query. Such a probability may be assessed based on factors such as a determination of certain features in a web page and in a text web advertisement, for example. After such factors for a web page/web advertisement pair have been determined, the web page/web advertisement pair may be associated with one or more expert statistical models. Respective weightings for one or more expert statistical models may be determined based on relevance scores between a web page and a particular expert statistical model. After one or more expert statistical models have been selected/determined, a probability that a user is going to click on such a web advertisement is determined. Such a probability may be useful in determining how to allocate web advertisements to web pages in an effort to maximize expected revenue paid to a provider of web advertisements when a user clicks on such web advertisements.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising:
    determining, by one or more processors, one or more first features of a web document;
    determining, by the one or more processors, relevance scores for individual ones of a set of two or more pre-existing expert statistical models based at least in part on comparison between the one or more first features of the web document and one or more second features of the set of two or more pre-existing expert statistical models, wherein at least one of the individual ones of the set of two or more pre-existing expert statistical models comprises a statistical model to assess at least the one or more first features of the web document;
    selecting, by the one or more processors, one or more expert statistical models, from the set of two or more pre-existing expert statistical models, based, at least in part, on the relevance scores;
    determining, by the one or more processors, weightings for the one or more selected expert statistical models based, at least in part, on the relevance scores for the one or more expert statistical models;
    assessing, by the one or more processors, the at least the one or more first features of the web document based, at least in part, on the one or more selected expert statistical models; and
    estimating, by the one or more processors, a click-through-rate probability for a web advertisement to be placed on the web document based on the weightings for the one or more selected expert statistical models.

2. The method of claim 1, wherein the web document comprises at least one of a web page or a search query.

3. The method of claim 1, wherein the relevance score between the web document and a particular expert statistical model is based, at least in part, on the one or more first features selected.

4. The method of claim 1, further comprising determining expected revenue for the web advertisement based at least in part on the click-through-rate probability and an auction bid corresponding to the web advertisement.

5. The method of claim 1, wherein the estimating the click-through-rate probability is based, at least in part, on at least one of a publisher identifier corresponding to a publisher of the web document, a predetermined position in which the publisher locates web advertisements on the web document, or a relevance score based on a comparison of the one or more first features in the web document and one or more third features of the web advertisement.

6. The method of claim 1, wherein the one or more first features comprise at least one of key words located in the web document, phrases detected in the web document, or taxonomy of content in the web document.

7. The method of claim 1, wherein the determining weightings for one or more expert statistical models comprises assigning weightings to the one or more first features detected in the web document, and selecting the one or more expert statistical models based at least in part on combined weightings of the one or more first features.

8. An article comprising:
    a non-transitory storage medium comprising machine-readable instructions stored thereon which are executable by one or more processors to:
        detect one or more first features of a web document;
        determine relevance scores for individual ones of a set of two or more pre-existing expert statistical models based at least in part on comparison between the one or more first features of the web document and one or more second features of the set of two or more pre-existing expert statistical models, wherein at least one of the individual ones of the set of two or more pre-existing expert statistical models comprises a statistical model to assess at least the one or more first features of the web document;
        select one or more expert statistical models, from the set of two or more pre-existing expert statistical models based, at least in part, on the relevance scores;
        determine weightings for one or more selected expert statistical models based, at least in part, on the one or more relevance scores for the expert statistical models;
        assess the at least the one or more first features of the web document based, at least in part, on the one or more selected expert statistical models; and estimate, based on the weightings for the one or more selected expert statistical models, a click-through-rate probability for a web advertisement to be placed on the web document.

9. The article of claim 8, wherein the machine-readable instructions are further executable by the one or more processors to determine the set of two or more expert statistical models to predict the click-through-rate probability for web documents and web advertisements based on an analysis of the one or more features in the web documents and the web advertisements.

10. The article of claim 8, wherein the machine-readable instructions are further executable by the one or more processors to select the one or more expert statistical models from the set of two or more expert statistical models based, at least in part, on the one or more features selected.

11. The article of claim 8, wherein the machine-readable instructions are further executable by the one or more processors to estimate the click-through-rate probability based, at least in part, on at least one of a publisher identifier corresponding to a publisher of the web document, a predetermined position in which the publisher locates one or more web advertisements on the web document, or a relevance score based on a comparison of the one or more features in the web document and one or more features of the web advertisement.

12. The article of claim 8, wherein the machine-readable instructions are further executable by the one or more processors to assign weightings to one or more features detected in the web document, and select and determined the weightings for the one or more expert statistical models based on combined weightings of the one or more features.

13. A system comprising:
a computing platform comprising one or more processors to:
detect one or more first features of a web document;
determine relevance scores for individual ones of a set of two or more pre-existing expert statistical models based at least in part on comparison between the one or more first features of the web document and one or more second features of the set of two or more pre-existing expert statistical models, wherein at least one of the individual ones of the set of two or more pre-existing expert statistical models comprises a statistical model to assess at least the one or more first features of the web document;
select one or more expert statistical models, from the set of two or more pre-existing expert statistical models based, at least in part, on the relevance scores;
determine weightings for one or more selected expert statistical models based, at least in part, on the one or more relevance scores for the expert statistical models;
assess the at least the one or more first features of the web document based, at least in part, on the one or more selected expert statistical models; and
estimate, based on the weightings for the one or more selected expert statistical models, a click-through-rate probability for a web advertisement to be placed on the web document.

14. The system of claim 13, wherein the web document comprises at least one of a web page or a search query.

15. The system of claim 13, wherein the computing platform is capable of determining the set of two or more expert statistical models to predict the click-through-rate probability for web documents and web advertisements based on an analysis of the one or more first features in the web documents and the web advertisements.

16. The system of claim 13, wherein computing platform is capable of determining expected revenue for the web advertisement based on the click-through-rate probability and an auction bid corresponding to the web advertisement.

17. The system of claim 13, wherein the computing platform is capable of estimating the click-through-rate probability based, at least in part, on at least one of a publisher identifier corresponding to a publisher of the web document, a predetermined position in which the publisher locates web advertisements on the web document, or a relevance score based on a comparison of the one or more features in the web document and one or more features of the web advertisement.

18. The system of claim 13, wherein the one or more first features comprise at least one of key words located in the web document, phrases detected in the web document, and taxonomy of content in the web document.

\* \* \* \* \*